United States Patent Office 3,817,929
Patented June 18, 1974

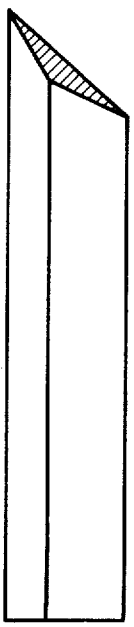
FIGURA 1
 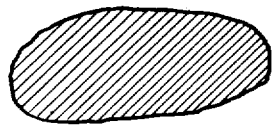 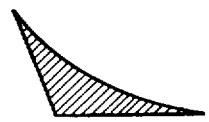
FIGURA 2

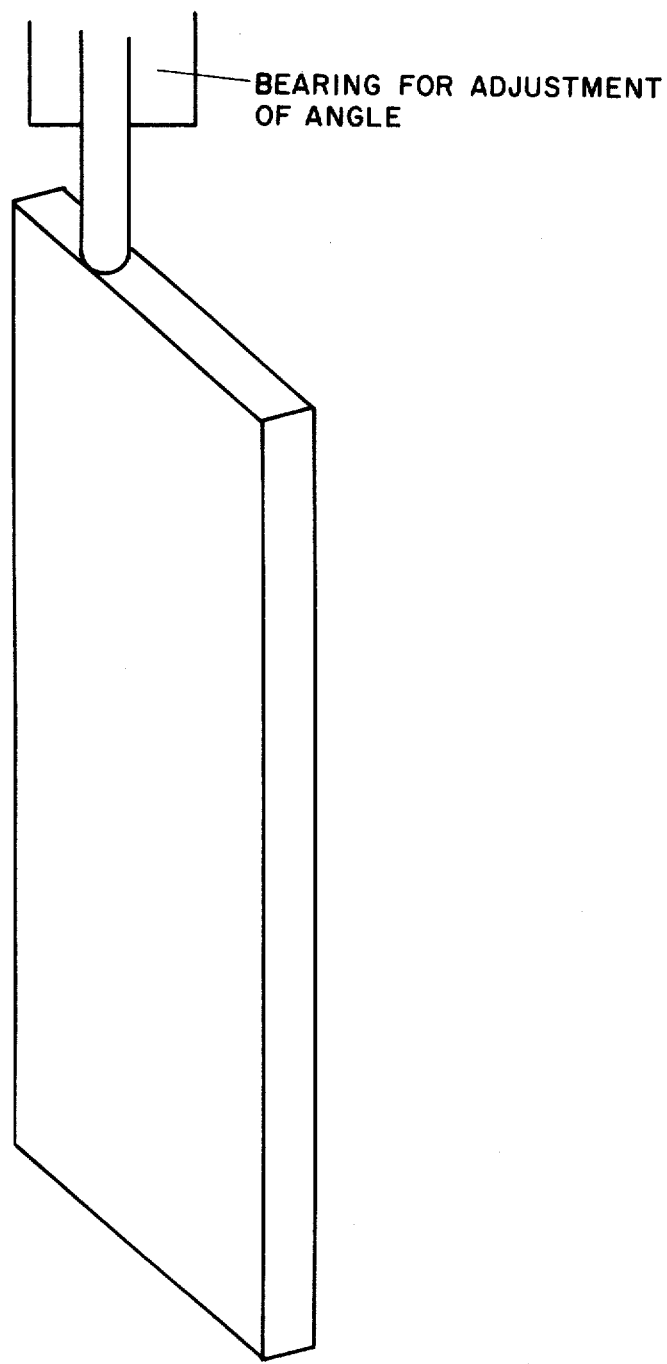
FIGURA 3

3,817,929
POLYCONDENSATION IN DROPLET AND COMPACT LIQUID PHASES
Lothar Buxbaum and Josef Hrach, Kufstein, Tirol, Austria, assignors to Ciba-Geigy A.G.
Filed Dec. 9, 1971, Ser. No. 206,508
Claims priority, application Austria, Dec. 18, 1970, A 11,419/70
Int. Cl. C08g 17/01
U.S. Cl. 260—75 M           4 Claims

ABSTRACT OF THE DISCLOSURE

The present invention relates to a polycondensation process for the production of thermoplastic saturated polyesters and it is characterized by the joint presence in the condensation polymerization reaction of two discrete liquid phases, a compact phase and a droplet phase.

---

The present invention relates to a polycondensation process for the production of thermoplastic saturated polyesters and it is characterized by the joint presence in the condensation polymerization reaction of two discrete liquid phases, a compact phase and a droplet phase.

In British Pat. 1,085,147 a process is described in which a particulated "precursor" material is converted into liquid droplets, in which form accelerated polycondensation takes place. The starting particles may be formed by spraying the melted material, allowing the melted material to run through fine apertures, or dropping the melted material onto a rapidly rotating disk. In a particular mode of operation of this process a precondensate of polyethylene terephthalate is formed, ground, sieved and fed at a specified rate into a column, at the base of which heated nitrogen gas is introduced to create a difference in temperature between the top and the bottom of the column, the latter temperature being higher than the melting point of the precondensate. In the free fall the particles melt to form droplets of a diameter between 0.5 and 1000 microns and are polycondensed in this form. The material is recovered at the bottom of the column.

The molecular weight of the final polymer depends on the particle size range obtained after grinding and screening.

It has been found that this process has a number of serious disadvantages which do not permit the advantages of the more rapid polycondensation achieved in the droplet phase to come into full effect. First, a precondensate has to be prepared in the liquid phase which has not to exceed a certain degree of polymerization. If this critical value is overstepped, after cooling and conversion into a suitable solid form the material can be comminuted only with the aid of complicated grinding machinery. The process necessitates termination of the liquid polycondensation reaction at a given point, cooling of the precondensate, grinding to a specific particle size range and screening of the material to separate the size fractions, before the final polycondensation stage in droplet form can be carried out. It has been found that the material adsorbs a substantial amount of moisture in these intermediate operations which has an adverse effect on the subsequent polycondensation in droplet form. A finely particulated powder has to be prepared in order to achieve a high rate of polymerization in droplet form, but at the same time this fineness renders the material all the more apt to absorb moisture. In their passage down the column some of the particles agglomerate and so diminish the rate of polycondensation. As droplets of widely different size are formed, they cannot be easily heated to a uniform degree. Moreover, droplets of different size have different rates of polycondensation, consequently the final particles do not exhibit a balanced range of molecular weights (e.g. a Flury distribution). This latter factor is made clear by the values in the table on page 3 of the said patent. Furthermore, the throughput is severely limited by the fact that caking of the solid particles and agglomeration of the melted droplets in the passage through the heated zone of the column must be avoided at all costs, in order to obtain a material suited for further processing and acceptable polycondensation times. It may, however, be necessary to comminute the final material before further use. Taken together, these disadvantages explain why the process of polycondensation in the droplet phase has not yet been practised on a full technical scale.

It has been found that all these disadvantages can be avoided and all the advantages of polycondensation in droplet form secured, including applicability on a technical manufacturing scale, when two discrete liquid phases are present in at least one stage of the polycondensation process, the one being a compact liquid phase, the other a droplet phase. In this process droplets of the precondensate are detached by mechanical action from a compact liquid phase and pass into an inert gas atmosphere, where they remain for a few seconds while the volatile components formed in the reaction are distilled off at an accelerated rate so that polycondensation in the droplet phase proceeds with correspondingly greater rapidity. Obeying the force of gravity, the droplets, which are polycondensed to a higher degree than the compact phase, fall into the latter phase and enter into ester exchange with it, which leads to an increase in the melt viscosity or the degree of polycondensation. After a melt viscosity of about 500 poises has been reached, polycondensation is continued either in the compact liquid or in the solid phase until the desired degree of polymerization is obtained.

The present process displays a number of advantages over polycondensation in the droplet phase alone and over polycondensation carried out solely in the compact phase.

The process according to the present invention is operable in conventional types of reaction equipment, or failing this existing reaction vessels can be adapted to the purpose. Owing to the greater ratio of surface area to volume due to droplet formation and the consequent increase in the distillation rate of the volatile reaction products, polycondensation can be completed in shorter times than it is possible when the process is carried out in the compact liquid phase. The polyester thereby attains to the predetermined degree of polymerization at an earlier point, and owing to the conditions prevailing in polycondensation it is exposed to a lesser degree of thermal action than otherwise. The values for the degree of polymerization are move evenly distributed as the two phases are brought into immediate contact with each other, whereas in droplet phase polymerization the size of the isolated droplets having a certain effect on the degree of polymerization.

It is of advantage to operate the process at a weight ratio of the droplet phase to the compact liquid phase not greater than 1:1. Although the proportion by weight of the droplet to the compact phase may be greater than this, a ratio of up to 1:1 facilitates operation as the amount of energy that has to be expended to form the droplets is not unduly high.

It is preferable to carry out droplet phase polycondensation immediately after completion of transesterification, concurrently with polycondensation of the compact liquid phase, before a melt viscosity of 500 poises is reached. The specified degree of polymerization is then reached more rapidly, precisely in the time interval in which the major proportion of the ether groups is being formed by reaction of the two diol components. This results in final polyesters of higher melting point. It is not advisable to exceed 500 poises as at melt viscosities greater than this an excessive amount of energy is needed for droplet formation.

As stated for simultaneous polycondensation in the droplet and the compact liquid phase, the formation and the catapult of the droplets out of the compact liquid phase is critical. A convenient method of droplet formation is as follows: The compact liquid phase is circulated by a mechanical stirrer in a reaction vessel fitted with baffles which are mounted so that they are immersed in the surface layer only of the liquid material at right angles to the direction of flow. Very conveniently is to catapult continuously by means of fast rotating stirrer the droplets until a melt viscosity of 500 poises is reached. The baffles may be in the form of bars, rods, blades or the like; some suitable shapes and cross-sections are shown in FIGS. 1 to 3. The baffles create a turbulent flow pattern which, together with the rapid rotation of the liquid, produces continuous droplet formation, provided that the liquid, collides against the baffle faces at a speed of 110 to 1500 m.min.$^{-1}$ or preferably 150 to 1500 m.min.$^{-1}$. The detached droplets should pass at once into a heated inert gas atmosphere to exclude any possibility of thermal degradation of the precondensate. The pressure of the inert gas atmosphere ranges from 760 to 0.05 Torr, depending on the degree of polycondensation that has been reached. The rate of the polycondensation reaction is accelerated by the fact that the volatile reaction products evaporate in vacuum more rapidy then otherwise. The inert gas is maintained preferably at the temperature of the melt.

The starting material for the process of this invention may be a direct esterification or transesterification mixture as obtained on completion of this reaction. These precondensates are prepared from dicarboxylid acids rsp. diesters of dicarboxylic acids and diols.

The dicarboxylic acid components are preferably aromatic dicarboxylic acids or aromatic dicarboxylic acid dialkyl esters, in particular aromatic dicarboxylic acids bearing 1 or 2 benzene rings and 8 to 20 carbon atoms, whose ankyl radicals have 1 to 4 carbon atoms. The preferred are terephthalic, isophthalic, naphthalene-(2,6)-dicarboxylic and biphenyl-4,4'-dicarboxylic acid, bis-(4-carboxyphenyl)-sulphone, bis-(4-carboxyphenyl)-methane, bis-(4-carboxyphenyl)-thioether, (4-carboxyphenylmethyl) - (4-carboxyphenyl)-ether, bis-(4-carboxyphenyl)-ethane and bis-(4-carboxyphenoxy)-butane. Aliphatic dicarboxylic acids and their difunctional dialkylesters which contain 4 to 10 carbon atoms and whose alkyl radicals have 1 to 4 carbon atoms can also be employed.

The diol components used are alkanediols containing 2 to 10 carbon atoms, diethylene glycol, 1,4-bis-(hydroxymethyl) - cyclohexane, 1,4-bis-(hydroxymethyl)-benzene and 2,2-bis-(4'-β-hydroxyethoxyphenyl)-propane. These difunctional components lead to the formation of linear polyesters. In addition, components with a valency greater than two which have branching and crosslinking action can be used in small amounts, i.e. 0.01 to 1 mol percent or preferably 0.01 to 0.1 mol percent relative to the diester component; examples of these are polyfunctional carboxylic acids, alcohols and hydroxycarboxylic acids such as glycerin, erythrite, pentaerythrite, tricarballylic acid, trimellitic acid, dihydroxybenzoic and racemic tartaric acid. Any of the other operational measures commonly practised in polyester production can be adopted, such as the addition of inert solids of low or high molecular weight, pigments and optical brighteners.

First, one or more acid components and one or more diol components as named above, normally in stoichiometric excess, are reacted at 150–250° C. in the presence of a catalyst under an inert gas atmosphere, if necessary under pressure. The time required for esterification or transesterification is measured from the start of distillation to the point at which, relatively to a given amount of the acid component, the volumetrically measured amount of the volatile alcohol component corresponding to the theoretical amount has distilled off. If this quantity is calculated, for example, in relation to dimethyl terephthalate, on completion of ester interchange 124 parts by volume of distillate are present per 300 parts by weight of dimethyl terephthalate. The time from the beginning of distillation to the point at which the last drop making up 124 parts by volume of distillate is distilled off is the transesterification time.

The so obtained mixture is transferred into a reaction vessel fitted with a high-speed stirrer with fixed baffles which are set so that the lower edges are immersed a short distance in the heated liquid material. The material is stirred at such a speed as to lead to prolific droplet formation on the baffle surfaces. Finally the melt viscosity, aided by the application of vacuum, reaches a point at which droplet formation ceases by itself.

The polycondensation reaction is continued in the compact liquid phase until the desired degree of polymerization is reached.

A special design baffle is illustrated in FIG. 3. Shaped in the form of a wide blade, which gives rise to intense splash droplet formation, it is set initially at right angles to the direction of flow, but as it would be too weak to withstand the force of the viscous melt formed later it is suspended from an eccentric bearing in the top of the vessel which is actuated when the maximum permissible moment of rotation is reached so that the baffle turns to form a smaller angle to the direction of flow, thereby reducing the area of impingement of the melt.

The baffle shown in FIG. 1 is used in the procedure of Example 1. FIG. 2 shows the cross-sections of other types. The invention is not however restricted to these variations in baffle design.

EXAMPLE 1

A suspension of 500 g. of a finely pulverized 3:7 lead-antimony alloy in 20 l. of ethylene glycol is entered into 540 l. of ethylene glycol, along with 1000 kg. of dimethyl terephthalate. A solution of 500 g. of metallic calcium in 80 l. of ethylene glycol is added. The mixture is raised to 220° C. and reacted for 4 hours, in which time the methanol and a proportion of the excess glycol are distilled off. The resulting mixture, which is predominantly bis-(hydroxyethyl)-terephthalate, is driven with pressure into a polycondensation autoclave of 3000 l. capacity, fitted with a spiral type stirrer and three 150 mm. wide baffles suspended from the cover which dip into the liquid material close to the stirring path of the spiral stirrer. The liquid material is circulated by the stirrer and collides against the baffles at a speed of 570 m.min.$^{-1}$. On the inner side of the baffles a powerful fan-shaped jet of variously sized droplets is formed which extends almost from one baffle to the next and width-wise from the centre of the autoclave to the periphery. When a vacuum of 0.1 torr is reached the liquid phase grows so viscous that droplet formation ceases. The excess glycol is distilled in 15 minutes, then a vacuum of 1 torr is applied for 60 minutes. After continued polycondensation for 150 minutes a colourless polyethylene terephthalate with an intrinsic viscosity of 0.75 dl./g. and melting point 261° C. is obtained.

EXAMPLE 2 (COMPARATIVE EXAMPLE)

Liquid phase polycondensation is carried out as in Example 1 in a reaction vessel without baffles. The excess glycol is distilled off in 20 minutes. A vacuum of 0.1 torr is reacted in 90 minutes. Polycondensation is then continued for further 200 minutes. The final product is a polyethylene terephthalate of pale yellowish colour with an intrinsic viscosity of 0.75 dl./g. and melting point 258° C.

Having thus disclosed the invention what we claim is:

1. In a process for the polycondensation of a diglycol ester of a dicarboxylic acid in a droplet phase or compact liquid or solid phase at temperatures between 200° C. and 350° C., the improvement for producing said polycondensate which comprises: reacting in an inert atmosphere at a pressure of 760 to 0.05 torr, a diglycol ester in a first stage, wherein the polycondensation reaction is carried out simultaneously in a droplet and in a compact liquid phase in a ratio of up to 1 to 1 with continuous intermixing of said droplet and compact phase until a viscosity of 500 poise is obtained, said droplets being formed by circulating the compact liquid phase with a stirrer at a speed of 110 to 1,500 m.min.$^{-1}$ in order that the compact liquid phase collide against overhead baffles extending below the level of said compact liquid phase; and in a second stage, the polycondensation is continued in either said compact liquid phase or in a solid phase formed from said liquid phase.

2. A process according to claim 1, wherein the compact liquid phase collides against the baffles at a speed of 150 to 1500 m.min.$^{-1}$.

3. A process according to claim 1 wherein said diglycol ester is a diglycol ester of an aromatic dicarboxylic acid.

4. A process according to claim 3 wherein said diglycol ester is bis-(hydroxyethyl)-terephthalate.

References Cited

UNITED STATES PATENTS

| | | | |
|---|---|---|---|
| 2,869,838 | 1/1959 | Ryder | 259—9 |
| 2,964,391 | 12/1960 | Benson | 23—285 |
| 3,359,074 | 12/1967 | Dobo | 23—283 |
| 3,617,225 | 11/1971 | Kuehne et al. | 23—285 |

FOREIGN PATENTS 1,085,147　9/1967　Great Britain.

MELVIN GOLDSTEIN, Primary Examiner